United States Patent
Huh

(10) Patent No.: US 10,162,229 B2
(45) Date of Patent: Dec. 25, 2018

(54) LIQUID CRYSTAL DISPLAY

(71) Applicant: SAMSUNG DISPLAY CO., LTD., Yongin-si, Gyeonggi-do (KR)

(72) Inventor: Su Jung Huh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 105 days.

(21) Appl. No.: 15/146,203

(22) Filed: May 4, 2016

(65) Prior Publication Data

US 2017/0097547 A1    Apr. 6, 2017

(30) Foreign Application Priority Data

Oct. 2, 2015 (KR) .................. 10-2015-0138936

(51) Int. Cl.

| | |
|---|---|
| G02F 1/1337 | (2006.01) |
| G02F 1/1343 | (2006.01) |
| G02F 1/1333 | (2006.01) |
| G02F 1/1335 | (2006.01) |
| G02F 1/1341 | (2006.01) |
| G02F 1/1362 | (2006.01) |
| G02F 1/1368 | (2006.01) |

(52) U.S. Cl.
CPC ...... *G02F 1/134336* (2013.01); *G02F 1/1341* (2013.01); *G02F 1/1368* (2013.01); *G02F 1/13439* (2013.01); *G02F 1/133377* (2013.01); *G02F 1/133514* (2013.01); *G02F 1/136286* (2013.01); *G02F 1/133707* (2013.01); *G02F 1/134363* (2013.01)

(58) Field of Classification Search
CPC ... G02F 1/134363; G02F 2001/134372; G02F 1/133707
See application file for complete search history.

(56) References Cited

U.S. PATENT DOCUMENTS

| | | | |
|---|---|---|---|
| 6,285,431 B2 * | 9/2001 | Lyu | ............... G02F 1/133707 349/129 |
| 7,072,017 B1 * | 7/2006 | Yoo | ............... G02F 1/133707 349/129 |
| 7,787,087 B2 | 8/2010 | Song et al. | |
| 2010/0225569 A1 | 9/2010 | Park et al. | |
| 2015/0092144 A1 * | 4/2015 | Lee | ................... G02F 1/1333 349/123 |

FOREIGN PATENT DOCUMENTS

| | | |
|---|---|---|
| KR | 100288766 B1 | 2/2001 |
| KR | 1020100097864 A | 9/2010 |
| KR | 1020110066724 A | 6/2011 |
| KR | 1020150037152 A | 4/2015 |

* cited by examiner

*Primary Examiner* — Kendrick Hsu
(74) *Attorney, Agent, or Firm* — Cantor Colburn LLP

(57) ABSTRACT

A liquid crystal display includes: a plurality of pixels arranged in a matrix form with m rows and n columns, where the pixels define a plurality of first and second pixel portions including parts of the pixels. Pixel electrodes of two of the pixels of the first pixel portion define a first domain, and pixel electrodes of the remaining three of the pixels define a second domain, and pixel electrodes of two of the pixels of the second pixel portion include the first domain, and pixel electrodes of the remaining three of the pixels include the second domain, and the first and second domains in the first pixel portion and the first and second domains in the second pixel portion are in a point symmetry relationship.

3 Claims, 13 Drawing Sheets

LIQUID CRYSTAL DISPLAY

This application claims priority to Korean Patent Application No. 10-2015-0138936, filed on Oct. 2, 2015, and all the benefits accruing therefrom under 35 U.S.C. § 119, the content of which in its entirety is herein incorporated by reference.

BACKGROUND

1. Field

Embodiments of the invention relate to a liquid crystal display.

2. Description of the Prior Art

A liquid crystal display has the advantages of low operating voltage, low power consumption, and portability, and thus the application fields thereof are wide and diverse to include the fields of a notebook computer, a monitor, an airship, an aircraft, and the like.

In general, a liquid crystal display includes an array substrate that displays an image using light transmittance of liquid crystals, an opposite substrate that is opposite to the array substrate, and a light assembly that provides light to the array substrate and the opposite substrate. The liquid crystal display typically includes pixels representing different colors, and a certain color may be represented by a combination of the colors that the pixels represent. In general, the pixels may be red (R), green (G), and blue (B), and various colors may be displayed by combinations of the red (R), green (G), and blue (B).

SUMMARY

In a liquid crystal display, each pixel may include a pixel electrode for controlling liquid crystals, and left/right and upper/lower viewing angles may have large deviation in accordance with the shape of the pixel electrode.

Accordingly, it is desired for pixels of the liquid crystal display to have a structure that may minimize the deviation of the left/right and upper/lower viewing angles in accordance with the shape of the pixel electrode.

According to an embodiment of the invention, a liquid crystal display includes: a plurality of pixels arranged in a matrix form with m rows and n columns, wherein the plurality of pixels defines a plurality of first and second pixel portions. In such an embodiment, a first pixel portion includes a pixel in the i-th row and j-th column, a pixel in the i-th row and (j+1)-th column, a pixel in the i-th row and (j+2)-th column, a pixel in the (i+1)-th row and j-th column, and a pixel in the (i+1)-th row and (j+1)-th column, and a second pixel portion includes a pixel in the i-th row and (j+3)-th column, a pixel in the i-th row and (j+4)-th column, a pixel in the (i+1)-th row and (j+2)-th column, a pixel in the (i+1)-th row and (j+3)-th column, and a pixel in the (i+1)-th row and (j+4) column. In such an embodiment, pixel electrodes of two of the pixels of the first pixel portion define a first domain, and pixel electrodes of the remaining three of the pixels define a second domain, which is different from the first domain. In such an embodiment, pixel electrodes of two of the pixels of the second pixel portion define the first domain, pixel electrodes of the remaining three of the pixels define the second domain, and the first and second domains in the first pixel portion and the first and second domains in the second pixel portion are in a point symmetry relationship.

According to another embodiment of the invention, a liquid crystal display includes: a plurality of pixels arranged in a matrix form with m rows and n columns, where the plurality of pixels defines a plurality of first and second pixel portions. In such an embodiment, a first pixel portion includes a pixel in the i-th row and j-th column, a pixel in the i-th row and (j+1)-th column, a pixel in the i-th row and (j+2)-th column, a pixel in the (i+1)-th row and j-th column, and a pixel in the (i+1)-th row and (j+1)-th column, and a second pixel portion includes a pixel in the i-th row and (j+3)-th column, a pixel in the i-th row and (j+4)-th column, a pixel in the (i+1)-th row and (j+2)-th column, a pixel in the (i+1)-th row and (j+3)-th column, and a pixel in the (i+1)-th row and (j+4) column. In such an embodiment, each of pixel electrodes of two of the pixels of the first pixel portion define first and second domains, and each of pixel electrodes of the remaining three of the pixels define third and fourth domains, which are different from the first and second domains. In such an embodiment, each of pixel electrodes of two of the pixels of the second pixel portion define the first and second domains, each of pixel electrodes of the remaining three of the pixels define the third and fourth domains, and the first to fourth domains in the first pixel portion and the first to fourth domains in the second pixel portion are in a point symmetry relationship.

The liquid crystal display according to embodiments of the invention may minimize the deviation of the left/right and upper/lower viewing angles.

BRIEF DESCRIPTION OF THE DRAWINGS

The above and other features of the invention will be more apparent from the following detailed description taken in conjunction with the accompanying drawings, in which.

DETAILED DESCRIPTION

Figure 1:
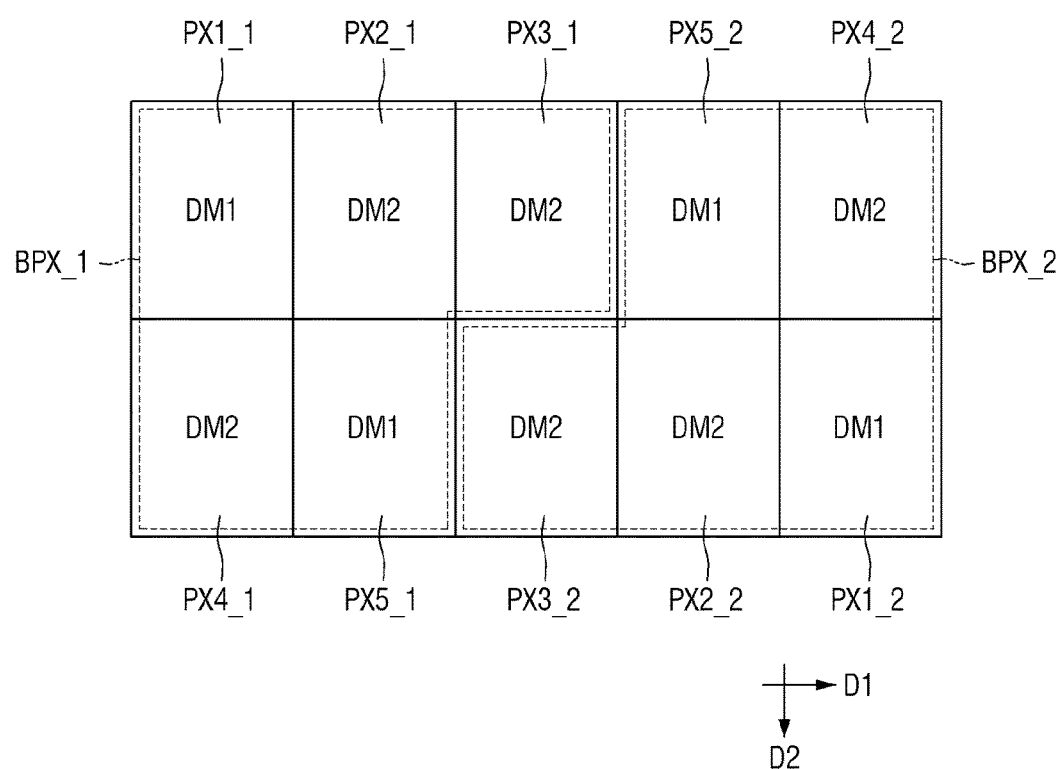
FIG. 1 is a schematic view of some pixels of a liquid crystal display according to an embodiment of the invention.

The invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein Exemplary embodiments of the invention will hereinafter be described in detail with reference to the accompanying drawings.

FIG. 1 is a schematic view of some pixels of a liquid crystal display according to an embodiment of the invention.

Referring to FIG. 1, an embodiment of a liquid crystal display includes a plurality of pixels PX1_1 to PX5_1 and PX1_2 to PX5_2, which are successively arranged along a first direction D1 and a second direction D2 that crosses the first direction D1. In such an embodiment, a first pixel portion BPX_1 or a second pixel portion BPX_2 is defined by five pixels. One first pixel portion BPX_1 and one second pixel portion BPX may be successively arranged along the first direction D1, and a structure defined by the first pixel portion BPX_1 and the second pixel portion BPX_2 that are successively arranged may be repeated in the first direction D1 and in the second direction D2 to form the liquid crystal display.

The first pixel portion BPX_1 includes first to fifth pixels PX1_1 to PX5_1. The first to third pixels PX1_1 to PX3_1 may be successively arranged along the first direction D1, and the fourth pixel PX4_1 may be arranged on one side (lower side in the drawing) in the second direction D2 of the first pixel PX1_1. The fifth pixel PX5_1 may be arranged on a side (right side in the drawing) in the first direction D1 of the fourth pixel PX4_1. In such an embodiment, the first pixel portion BPX_1 may have a structure in which two pixels in the first direction D1 and two pixels in the second direction D2 are symmetrically arranged with respect to the first direction D1 and the second direction D2, and one pixel is asymmetrically arranged on one side (right side in the drawing) in the first direction D1.

In such an embodiment, where pixels are arranged in a matrix form with m rows and n columns in the liquid crystal display, the pixel portions may be defined with reference to a pixel in an i-th row and an j-th column that correspond to an i-th row and a j-th column of the matrix. Herein, i and j are natural numbers. In one embodiment, for example, the first pixel portion BPX_1 may include a pixel in the i-th row and j-th column, a pixel in the i-th row and (j+1)-th column, a pixel in the i-th row and (j+2)-th column, a pixel in the (i+1)-th row and j-th column, and a pixel in the (i+1)-th row and (j+1)-th column, and the second pixel portion BPX_2 may include a pixel in the i-th row and (j+3)-th column, a pixel in the i-th row and (j+4)-th column, a pixel in the (i+1)-th row and (j+2)-th column, a pixel in the (i+1)-th row and (j+3)-th column, and a pixel in the (i+1)-th row and (j+4) column.

In such an embodiment, the pixel in the i-th row and j-th column corresponds to the first pixel PX1_1 of the first pixel portion BPX_1, the pixel in the i-th row and (j+1)-th column corresponds to the second pixel PX2_1 of the first pixel portion BPX_1, the pixel in the i-th row and (j+3)-th column corresponds to the third pixel PX3_1 of the first pixel portion BPX_1, the pixel in the (i+1)-th row and j-th column corresponds to the fourth pixel PX4_1 of the first pixel portion BPX_1, and the pixel in the (i+1)-th row and (j+1)-th column corresponds to the fifth pixel PX5_1 of the first pixel portion BPX_1. In such an embodiment, the pixel in the i-th row and (j+3) column corresponds to the fifth pixel PX5_2 of the second pixel portion BPX_2, the pixel in the i-th row and (j+4)-th column corresponds to the fourth pixel PX4_2 of the second pixel portion BPX_2, the pixel in the (i+1)-th row and (j+2)-th column corresponds to the third pixel PX3_2 of the second pixel portion BPX_2, the pixel in the (i+1)-th row and (j+3)-th column corresponds to the second pixel PX2_2 of the second pixel portion BPX_2, and the pixel in the (i+1)-th row and (j+4) column corresponds to the first pixel PX1_2 of the second pixel portion BPX_2. Hereinafter, for convenience in description, the pixels in the i-th row and j-th column to the i-th row and (j+4)-th column and the pixels in the (i+1)-th row and j-th column to the (i+1)-th row and (j+4)-th column will be referred to as the first to fifth pixels PX1_1 to PX5_1 of the first pixel portion BPX_1 and the first to fifth pixels PX1_2 to PX5_2 of the second pixel portion BPX_2.

In an embodiment, two pixels PX1_1 and PX5_1 of the first to fifth pixels PX1_1 to PX5_1 may define a first domain DM1, and the remaining three pixels PX2_1, PX3_1, and PX4_1 may define a second domain DM2. The domain that a pixel defines, that is, whether the pixel defines the first domain DM1 or the second domain DM2, may be determined by the shape of a pixel electrode of the pixel to be described later. Depending on which of the first and second domains DM1 and DM2 the pixel defines, the pixel may have improved left/right viewing angle characteristics or the upper/lower viewing angle characteristics.

In one embodiment, for example, the first and fifth pixels PX1_1 and PX5_1 define the first domain DM1, and the second to fourth pixels PX2_1 to PX4_1 define the second domain DM2. Accordingly, two pixels having the first domain DM1 and three pixels having the second domain DM2 may be arranged in a first pixel portion BPX_1, and the deviation of the upper/lower and left/right viewing angles may be minimized.

In such an embodiment, the second pixel portion BPX_2 may have a shape that is obtained by rotating the first pixel portion BPX_1 by about 180°. The first pixel portion BPX_1 and the second pixel portion BPX_2 are asymmetrical with respect to an imaginary straight line that extends along the first direction D1, and are also asymmetrical with respect to an imaginary straight line that extends along the second direction D2. However, since the second pixel portion BPX_2 has the shape that is obtained by rotating the first pixel portion BPX_1 by about 180°, the first pixel portion BPX_1 and the second pixel portion BPX_2 may be symmetrical with respect to an imaginary straight line that extends along the first direction D1 and may also be symmetrical with respect to an imaginary straight line that extends along the second direction D2 in such an embodiment where the first pixel portion BPX_1 and the second pixel portion BPX_2 are adjacent to each other along the first direction D1 and define one unit. In such an embodiment, the first pixel portion BPX_1 and the second pixel portion BPX_2 may be in a point symmetry relationship.

In an embodiment, where the second pixel portion BPX_2 has the shape that is obtained by rotating the first pixel portion BPX_1 by about 180°, one first pixel portion BPX_1 and one second pixel portion BPX_2 may be adjacently arranged along the first direction to be symmetrical to each other both in the first and second directions D1 and D2, and the one first pixel portion BPX_1 and the one second pixel portion BPX_2, which are adjacently arranged, may be repeatedly arranged to manufacture the liquid crystal display.

In an embodiment, where the second pixel portion BPX_2 has the shape that is obtained by rotating the first pixel portion BPX_1 by about 180°, as illustrated in FIG. 1, the upper left pixel of the first pixel portion BPX_1 may become the first pixel PX1_1 of the first pixel portion BPX_1, and the lower right pixel of the second pixel portion BPX_2 may become the first pixel PX1_2 of the second pixel portion BPX_2. In the same manner, the second and third pixels PX2_1 and PX3_1 of the first pixel portion BPX_1 may be successively arranged on one side (right side in the drawing) in the first direction D1 of the first pixel PX1_1 of the first pixel portion BPX_1, whereas the second and third pixels PX2_2 and PX3_2 of the second pixel portion BPX_2 may be successively arranged on the other side (left side in the drawing) in the first direction D1 of the first pixel PX1_2 of the second pixel portion BPX_2. In such an embodiment, the fourth pixel PX4_1 of the first pixel portion BPX_1 may be arranged on one side (lower side in the drawing) in the second direction D2 of the first pixel PX1_1 of the first pixel portion BPX_1, and the fourth pixel PX4_2 of the second pixel portion BPX_2 may be arranged on the other side (upper side in the drawing) in the second direction D2 of the first pixel PX1_2 of the second pixel portion BPX_2. In such an embodiment, the fifth pixel PX5_1 of the first pixel portion BPX_1 may be arranged on one side (right side in the drawing) in the first direction D1 of the fourth pixel PX4_1 of the first pixel portion BPX_1, whereas the fifth pixel PX5_2 of the second pixel portion BPX_2 may be arranged on the other side (left side in the drawing) in the first direction D1 of the fourth pixel PX4_2 of the second pixel portion BPX_2.

Hereinafter, the detailed structure of the first and second pixel portions BPX_1 and BPX_2 and the pixels included therein will be described in detail.

Figure 2:
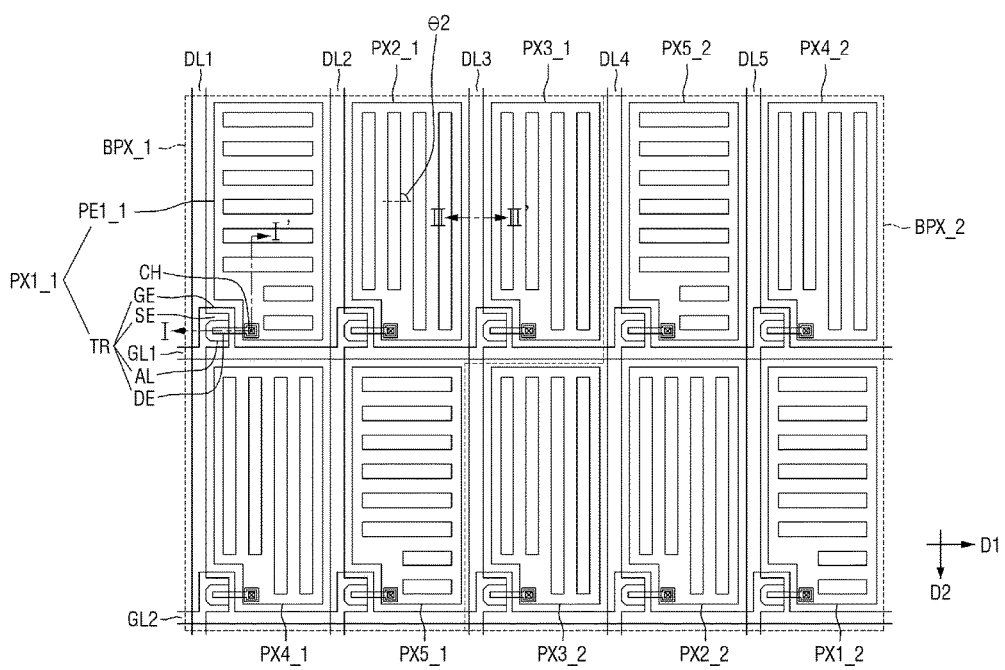
FIG. 2 is a plan view of some pixels of a liquid crystal display according to an embodiment of the invention.
Figure 3:
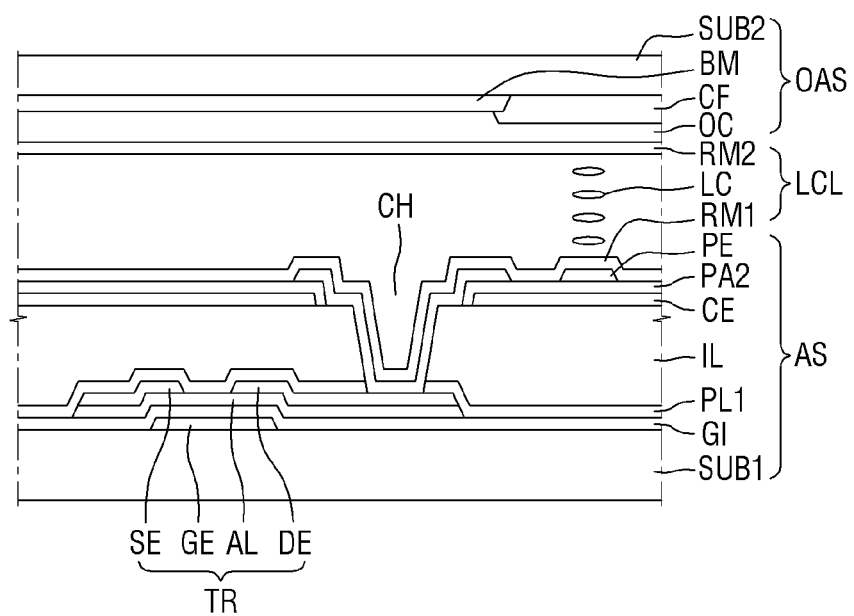
FIG. 3 is a cross-sectional view taken along line I-I' of FIG. 2.

FIG. 2 is a plan view of some pixels of a liquid crystal display according to an embodiment of the invention, and FIG. 3 is a cross-sectional view taken along line I-I' of FIG. 2.

Referring to FIGS. 2 and 3, an embodiment of a liquid crystal display according to the invention includes an array substrate AS, an opposite substrate OAS, and a liquid crystal layer LCL between the array substrate AS and the opposite substrate OAS.

The array substrate AS may be a thin film transistor substrate, on which thin film transistors TR for driving liquid crystal molecules LC of the liquid crystal layer LCL are arranged, and the opposite substrate OAS may be a substrate that is opposite to the array substrate AS.

Hereinafter, the array substrate AS will be described in detail.

In an embodiment, the array substrate AS includes a first based substrate SUB1. The first base substrate SUB1 may be a transparent insulating substrate. In one embodiment, for example, the first base substrate SUB1 may include or be formed of a glass substrate, a quartz substrate, or a transparent resin substrate. In an alternative embodiment, the first base substrate SUB1 may include high heat resistance polymer or plastic.

In such an embodiment, gate wirings GL (e.g., GL1 and GL2) and GE that include a plurality of gate lines GL and gate electrodes GE are disposed on the first base substrate SUB1. The gate line GL transfers a gate signal, and extends in the first direction D1. The gate wiring GL may include an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum or a molybdenum alloy, chrome (Cr), tantalum (Ta), or titanium (Ti). The gate wirings GL and GE may have a single-layer structure or a multilayer structure that includes at least two conductive layers having different physical properties from each other. One of the conductive layers may include or be made of a low-resistance metal, for example, an aluminum-based metal, a silver-based metal, or a copper-based metal, to reduce a signal delay or voltage drop of the gate wirings GL and GE, and the other of the conductive layers may be made of a material having superior contact characteristics with other materials, in particular, indium tin oxide ("ITO") and indium zinc oxide ("IZO"), such as a molybdenum-based metal, chrome, titanium, or tantalum. In one embodiment, for example, such a combination may be a lower chrome layer and an upper aluminum layer, or a lower aluminum layer and an upper molybdenum layer. However, the invention is not limited thereto, and the gate wirings GL and GE may include or be formed of various kinds of metals and conductors.

The gate electrode GE projects or extends from the gate line GL, and is connected to the gate line GL.

In such an embodiment, a gate insulating layer GI is disposed on the gate wirings GL and GE. The gate insulating layer GI may include or be made of an insulating material, e.g., silicon nitride or silicon oxide. The gate insulating layer GI may have a single-layer structure or a multilayer structure that includes two insulating layers having different physical properties from each other.

In such an embodiment, a semiconductor layer AL is disposed on the gate insulating layer GI to overlap the gate electrode GE e.g., at least a portion thereof. The semiconductor layer AL may include amorphous silicon, polycrystalline silicon, or oxide semiconductor.

Although not illustrated in the drawing, an ohmic contact member (not illustrated) may be further disposed on the semiconductor layer. The ohmic contact member (not illustrated) may include or be formed of n+ hydrogenated amorphous silicon doped with high-density n-type impurities or silicide. A pair of the ohmic contact members (not illustrated) may be disposed on the semiconductor layer AL. In an embodiment, where the semiconductor layer AL includes oxide semiconductor, the ohmic contact member (not illustrated) may be omitted.

In such an embodiment, data wirings DL (e.g., DL1 to DL5) and SE are disposed on the semiconductor layer AL and the gate insulating layer GI, and the data wirings DL and SE include a data line DL and a source electrode SE.

The data line DL transfers a data signal, and may extend in the second direction D2 to cross the gate line GL.

The source electrode SE may be branched from the data line DL, and may overlap the gate electrode GE, e.g., at least a portion thereof.

A drain electrode DE may be arranged to be spaced apart from the source electrode SE, and the semiconductor layer AL is interposed between the drain electrode DE and the source electrode SE. The drain electrode DE may overlap the gate electrode GE, e.g., at least a portion thereof.

The data wiring DL may include or be formed of aluminum, copper, silver, molybdenum, chrome, titanium, tantalum, or an alloy thereof, and may have a multilayer structure including a lower layer (not illustrated) of refractory metal and a low-resistance upper layer (not illustrated) formed on the lower layer, but is not limited thereto.

The gate electrode GE, the source electrode SE and the drain electrode DE collectively define a thin film transistor TR together with the semiconductor layer AL, and a channel of the thin film transistor TR is electrically connected to the gate line GL and the data line DL as described above.

In an embodiment, a first passivation layer PA1 is disposed on the gate insulating layer GI and the thin film transistor TR. The first passivation layer PA1 may include or be made of an organic insulating material or an inorganic insulating material, and may cover the thin film transistor TR.

A protection layer IL may be disposed on the first passivation layer PA1. The protection layer IL may perform planarization of an upper portion of the first passivation layer PA1. The protection layer IL may include or be made of an organic material or a photosensitive organic composition. In an embodiment, a separate photosensitive organic composition may be disposed on a lower portion of the protection layer IL, but is not limited thereto.

In an embodiment, a contact hole CH that exposes a part of the thin film transistor TR, e.g., a part of the drain electrode DE, is defined through the protection layer IL and the first passivation layer PA1.

A common electrode CE is disposed on the protection layer IL. The common electrode CE may be disposed on a surface on the protection layer IL in the remaining region except for a region in which the contact hole CH is arranged and a region therearound, but is not limited thereto. In an embodiment where a liquid crystal display includes vertical alignment type liquid crystals, the common electrode may be disposed on the opposite substrate OAS.

A common voltage is applied to the common electrode CE, and thus the common electrode CE may generate an electric field together with the pixel electrode PE to be described later.

A second passivation layer PA2 is disposed on the common electrode CE. In an embodiment, the second passivation layer PA2 may include or be made of an organic insulating material or an inorganic insulating material, similarly to the first passivation layer PA1. In an alternative embodiment, the chemical compositions of the first and second passivation layers PA1 and PA2 may differ from each other. In such an embodiment, the second passivation layer PA2 may allow the common electrode CE that is arranged below the second passivation layer PA2 and the pixel electrode PE that is disposed on the second passivation layer PA2 to be spaced apart from each other for a predetermined distance, such that the second passivation layer PA2 may function as an interlayer insulating layer, and an electric field may be generated between the common electrode CE and the pixel electrode PE.

The pixel electrode PE is disposed on the second passivation layer PA2. A part of the pixel electrode PE may be physically connected to the drain electrode DE through the contact hole CH, and thus the pixel electrode PE may receive a voltage from the drain electrode DE.

The pixel electrode may include or be made of a transparent conductive material, such as ITO, IZO, indium tin zinc oxide ("ITZO"), or aluminum zinc oxide ("AZO"), and may include a plurality of slits SL that correspond to an opening defined or formed therethrough.

Different types of slits SL may be arranged for the pixel electrodes PE of the adjacent pixels, and domains of the respective pixels may be determined by the slits.

In an embodiment, as shown in FIG. 2, the first and fifth pixels PX1_1 and PX5_1 of the first pixel portion BPX_1 and the first and fifth pixels PX1_2 and PX5_2 of the second pixel portion BPS_2 may define the first domain DM1, and the slits SL of the pixel electrodes PE1_1, PE5_1, PE1_2, and PE5_2 of the pixels may have a first included angle θ1 of about zero degree (0°), which is an included angle with respect to an imaginary straight line that extends along the first direction D1. In such an embodiment, the slits SL of the pixel electrodes PE1_1, PE5_1, PE1_2, and PE5_2 of the pixels PX1_1, PX5_1, PX1_2, and PX5_2 defining the first domain DM1 may be arranged in parallel to the imaginary straight line that extends along the first direction. In such an embodiment where the slits of the pixel electrodes are arranged in parallel to the imaginary straight line that extends along the first direction as described above, the slits may have relatively superior left/right viewing angle in comparison to the slits arranged in another direction.

In an embodiment, as shown in FIG. 2, the second to fourth pixels PX2_1, PX3_1, and PX4_1 of the first pixel portion BPX_1 and the second to fourth pixels PX2_2, PX3_2, and PX4_2 of the second pixel portion BPX_2 may defined the second domain DM2, and the slits SL of the pixel electrodes PE2_1, PE3_1, PE4_1, PE2_2, PE3_2, and PE4_2 of the pixels PX2_1, PX3_1, PX4_1, PX2_2, PX3_2, and PX4_2 may have a second included angle θ2 of about 90°, which is an included angle with respect to an imaginary straight line that extends along the first direction D1. In such an embodiment, the slits SL of the pixel electrodes PE2_1, PE3_1, PE4_1, PE2_2, PE3_2, and PE4_2 of the pixels PX2_1, PX3_1, PX4_1, PX2_2, PX3_2, and PX4_2 having the second domain DM2 may be arranged vertically to the imaginary straight line that extends along the first direction D1. In such an embodiment where the slits SL of the pixel electrodes are arranged vertically to the imaginary straight line that extends along the first direction as described above, the slits may have relatively superior upper/lower viewing angle in comparison to the slits SL arranged in another direction.

Hereinafter, the opposite substrate OAS will be described in detail.

In an embodiment, as shown in FIG. 3, the opposite substrate OAS includes a second base substrate SUB2, a light blocking member BM, and an overcoat layer OC.

The light blocking member BM may be disposed on (below in the drawing) the second base substrate SUB2. The light blocking member BM may be arranged to overlap the transistor TR of each pixel PX, the data line DL and the gate line GL, and thus may effectively prevent light leakage due to misalignment of the liquid crystal molecules LC.

A color filter CF is disposed on the second base substrate SUB2 and the light blocking member BM. The color filter CF may determine a color of light that is emitted to an outside of the second base substrate SUB2 by transmitting a specific wavelength band of the light that is incident from the outside of the first base substrate SUB1 and intercepting the remaining wavelength band.

In one embodiment, for example, the color filter CF for being visually recognized as red may transmit the light having a wavelength band of about 580 nanometers (nm) to about 780 nm, and absorb (and/or reflect) the light having the remaining wavelength band. The color filter CF for being visually recognized as green may transmit the light having a wavelength band of about 450 nm to about 650 nm, and absorb the light having the remaining wavelength band. Further, the color filter CF for being visually recognized as blue may transmit the light having a wavelength band of about 380 nm to about 560 nm, and absorb the light having the remaining wavelength band.

In an embodiment, where the liquid crystal display has red, green and blue color filters CF, the red, green and blue color filters CF may be alternately arranged along the first direction D1, and the color filters CF having the same color may be successively arranged along the second direction D2, but the arrangement of the color filters CF is not limited thereto. Alternatively, three kinds of color filters CF may be arranged in positions corresponding to three vertices of a triangle. In such an embodiment, the color filters CF may be arranged in various methods, and the arrangement of the color filters CF is not limited to the above-described arrangement structure of the color filters CF.

An overcoat layer OC may be disposed on the light blocking member BM and the color filters CF to reduce a step height that occurs due to the light blocking member BM and the color filters CF. In some embodiments, the overcoat layer OC may be omitted.

Hereinafter, the light crystal layer LCL will be described in detail.

In an embodiment, the liquid crystal layer LCL includes a plurality of liquid crystal molecules LC having dielectric anisotropy. The liquid crystal molecules LC may be vertically aligned liquid crystal molecules LC that are arranged in a direction that is parallel to the substrates AS and OAS between the array substrate AS and the opposite substrate OAS. In such an embodiment, when an electric field is applied between the array substrate AS and the opposite substrate OAS, the liquid crystal molecules LC are rotated in a specific direction between the array substrate AS and the opposite substrate OAS to transmit or intercept the light.

In an embodiment, reactive mesogen layers RM1 and RM2 are further provided to pre-tilt the liquid crystal molecules LC of the liquid crystal layer LCL. The reactive mesogen layers RM1 and RM2 include a first reactive mesogen layer RM1 that is arranged between the pixel electrode PE and the liquid crystal layer LCL, and a second reactive mesogen layer RM2 that is arranged between the overcoat layer OC and the liquid crystal layer LCL.

The reactive mesogen is a material having a property that is similar to the property of the typical liquid crystal molecules LC, and has a form in which photo-reactive monomer is polymerized. The reactive mesogen layers RM1 and RM2 including or made of reactive mesogen may be provided by polymerizing the photo-reactive monomers through applying of light, such as ultraviolet rays, to the photo-reactive monomers.

The photo-reactive monomers may be included in the liquid crystal layer LCL. In one embodiment, for example, the liquid crystal layer LCL may include not only the liquid crystal molecules LC but also photo-reactive monomers. By curing the photo-reactive monomers through applying of the light, such as ultraviolet rays, to the liquid crystal layer LCL in a state where the electric field is applied to the liquid crystal layer LCL, the reactive mesogen layers RM1 and RM2 may be formed.

In an embodiment, polymer in which the photo-reactive monomers are polymerized may form a pre-tilt angle through extension in a predetermined direction, and may pre-tilt the liquid crystal molecules LC. In such an embodiment, the liquid crystal molecules LC of the liquid crystal layer LCL may be pre-tilted at a predetermined angle by the reactive mesogen layers RM1 and RM2 having the pre-tilt angle. The liquid crystal molecules LC of the liquid crystal layer LCL pre-tilted at the predetermined angle may have a faster response speed in comparison to the liquid crystal molecules LC that are not pre-tilted when the electric field is applied. In such an embodiment, as described above, the reactive mesogen layers RM1 and RM2 may be used as a director of the liquid crystal layer LCL.

Due to mutual reaction between the array substrate AS, the opposite substrate OAS, and the liquid crystal layer LCL, the liquid crystal display may display a characteristic image or an image, and deviation of left/right and upper/lower viewing angles may be minimized through arrangement of the first and second domains DM1 and DM2 of the pixels included in the liquid crystal display.

Hereinafter, the left/right and upper/lower viewing angle characteristics of an embodiment of the liquid crystal display will be described in greater detail.

Figure 4:
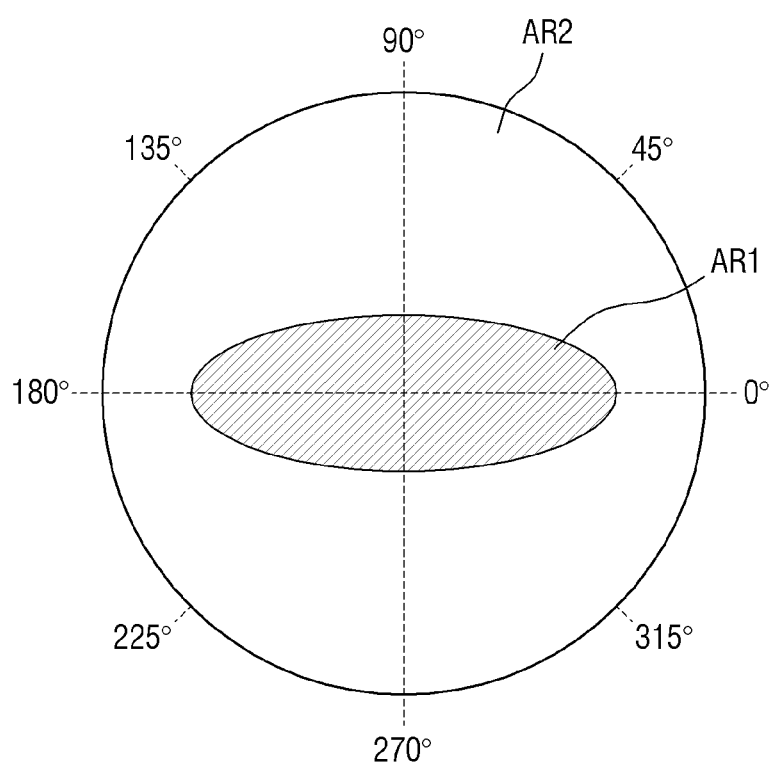
FIGS. 4 and 5 are graphs showing viewing angle characteristics of a conventional liquid crystal display.
Figure 5:
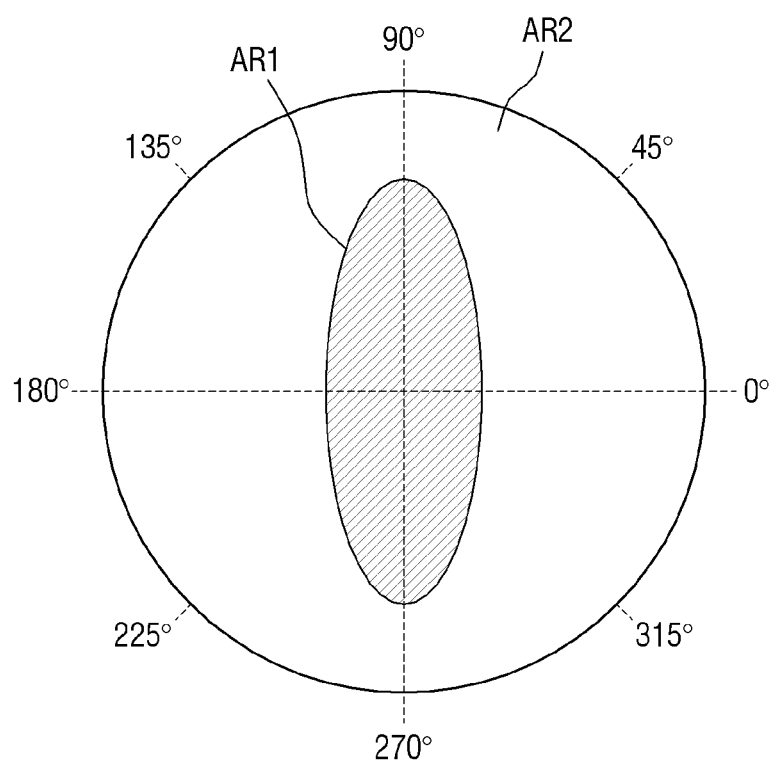
Figure 6:
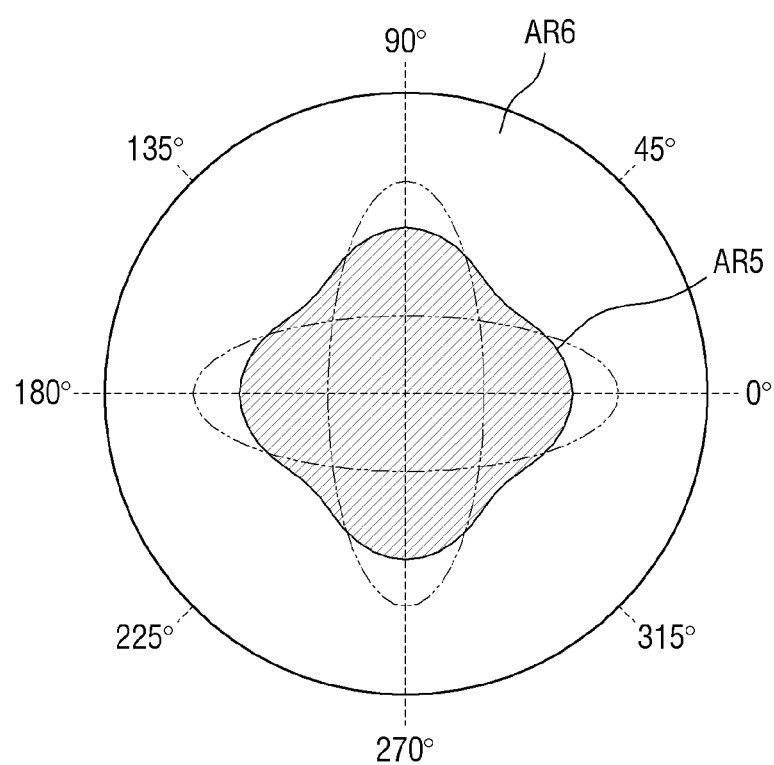
FIG. 6 is a graph showing viewing angle characteristics of a liquid crystal display according to an embodiment of the invention.

FIGS. 4 and 5 are graphs showing viewing angle characteristics of a conventional liquid crystal display, and FIG. 6 is a graph showing viewing angle characteristics of another conventional liquid crystal display.

FIG. 4 is a graph showing the viewing angle characteristics of a liquid crystal display including pixels including slits SL in only the horizontal direction like the first pixel PX1_1 of the first pixel portion BPX_1 of FIG. 2, and FIG. 5 is a graph showing the viewing angle characteristics of a liquid crystal display including pixels including slits SL only in the vertical direction like the second pixel PX2_1 of the first pixel portion BPX_1 of FIG. 2. FIG. 6 is a graph showing the viewing angle characteristics of a liquid crystal display that includes a plurality of first pixel portions BPX_1 and second pixel portions BPX_2 according to an embodiment of the invention.

Referring to FIG. 4, in the case of the graph showing the viewing angle characteristics of a liquid crystal display where slits SL of the pixels are only in the horizontal direction, a first region AR1 having a left/right width that is wider than an upper/lower width and a second region AR2 that is the remaining region except for the first region AR1 are included. In this case, the first region AR1 may be defined as a region including viewing angles that satisfy a specific contrast ratio, and a contrast ratio of about 1000:1 is exemplarily used. However, the contrast ratio is not divided into the contrast ratio of about 1000:1 and another contrast ratio that is not the contrast ratio of about 1000:1 based on the first region AR1 and the second region AR2, but the contrast ratio may be gradually changed over the whole region in which the viewing angle characteristics are indicated.

In FIG. 4, since the first region of FIG. 4 has the left/right width that is wider than the upper/lower width, the liquid crystal display including the pixels including the slits SL only in the horizontal direction has a large left/right viewing angle, but the upper/lower viewing angle thereof may be small.

Referring to FIG. 5, in the case of the graph showing the viewing angle characteristics of a liquid crystal display where the slits SL of the pixels are only in the vertical direction, a third region AR3 having an upper/lower width that is wider than a left/right width and a fourth region AR4 that is the remaining region except for the third region AR3 are included. Since the third region AR3 of FIG. 5 has the upper/lower width that is wider than the left/right width, the liquid crystal display including the pixels including the slits SL only in the vertical direction has a large upper/lower viewing angle, but the left/right viewing angle thereof may be small.

Referring to FIG. 6, in an embodiment of a liquid crystal display according to the invention, where the pixels thereof include slits SL in the horizontal direction and in the vertical direction as in an embodiment of the liquid crystal display illustrated in FIG. 2, a fifth region AR5 having a left/right width and an upper/lower width, which have similar values, and a sixth region AR6 that is the remaining region except for the fifth region AR5 are included.

The difference in length between the left/right width and the upper/lower width of the fifth region AR5 is smaller than the lengths of the left/right width and the upper/lower width of the first region AR1 or the third region AR3. Accordingly, as illustrated in FIG. 2, such an embodiment of the liquid crystal display that includes both the pixels including the slits SL in the horizontal direction and the pixels including the slits SL in the vertical direction may have a smaller deviation of the left/right and upper/lower viewing angles than that of the conventional liquid crystal display including the pixels including the slits in only one of the horizontal direction and the vertical direction.

Figure 7:
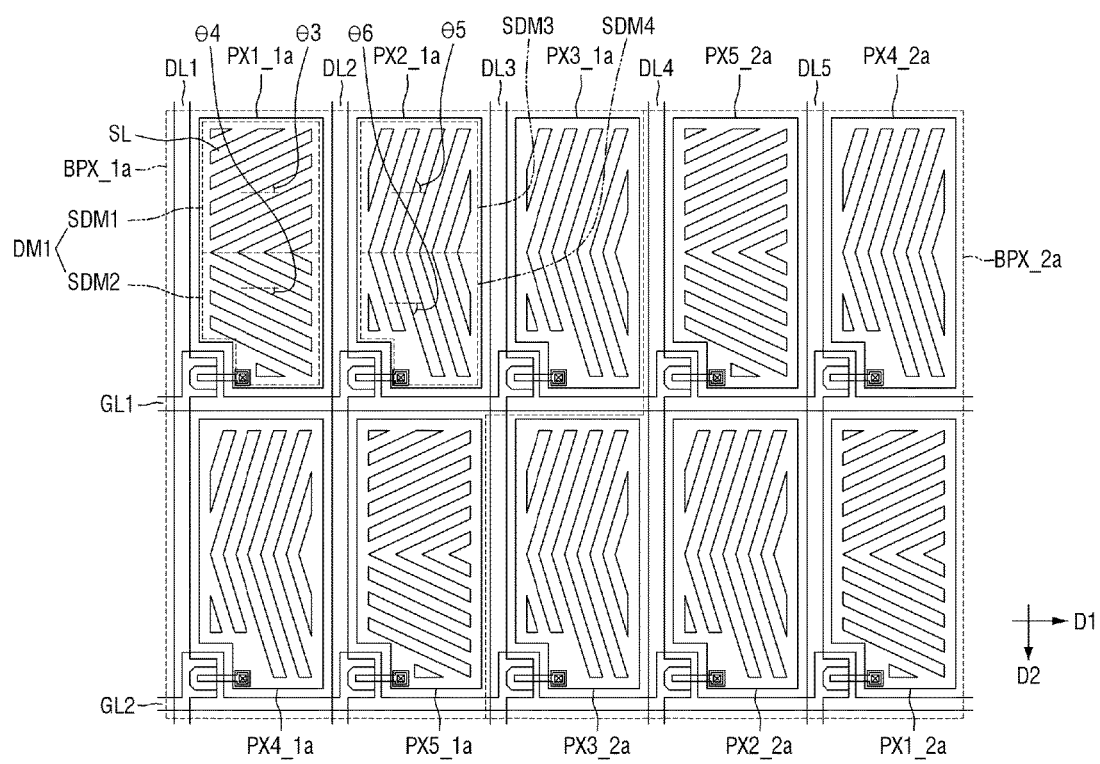
FIG. 7 is a plan view of some pixels according to an alternative embodiment of the invention.

FIG. 7 is a plan view of some pixels according to an alternative embodiment of the invention.

The liquid crystal display shown in FIG. 7 is substantially the same as the liquid crystal display shown in FIGS. 1 to 3 except for the pixel electrodes. The same or like elements shown in FIG. 7 have been labeled with the same reference characters as used above to describe the embodiments of the liquid crystal display shown in FIGS. 1 to 3, and any repetitive detailed description thereof will hereinafter be omitted or simplified.

Referring to FIG. 7, in an embodiment, the first domain DM1 further includes a first sub-domain SDM1 including an imaginary straight line that extends in the first direction D1 and slits SL having a third included angle θ3, and a second sub-domain SDM2 including an imaginary straight line that extends in the first direction D1 and slits SL having a fourth included angle θ4. In such an embodiment, the second domain DM2 includes a third sub-domain SDM3 including an imaginary straight line that extends in the first direction D1 and slits SL having a fifth included angle θ5, and a fourth sub-domain SDM4 including an imaginary straight line that extends in the first direction D1 and slits SL having a sixth included angle θ6.

In such an embodiment, the directions in which the third included angle θ3 and the fourth included angle θ4 are measured from the imaginary straight line that extends in the first direction D1 may differ from each other, but may have the same absolute value. In the same manner, the directions in which the fifth included angle θ5 and the sixth included angle θ6 are measured from the imaginary straight line that extends in the first direction D1 may differ from each other, but may have the same absolute value. That is, the slits SL that are included in the first sub-domain SDM1 and the second sub-domain SDM2 may be symmetrical to each other with respect to the imaginary straight line that extends in the first direction D1, and the slits SL that are included in the third sub-domain SDM3 and the fourth sub-domain SDM4 may be symmetrical to each other with respect to the imaginary straight line that extends in the first direction D1.

In such an embodiment, the third and fourth included angles θ3 and θ4, which are angles of slits formed in pixel electrodes PE1_1a, PE5_1a, PE1_2a, and PE5_2a of the pixels having the first domain DM1 may have values that is equal to or larger than about zero degree (0°) and smaller than about 45°, and the fifth and sixth included angles θ5 and θ6, which are angles of slits formed at pixel electrodes PE2_1a, PE3_1a, PE4_1a, PE2_2a, and PE4_2a of the pixels having the second domain DM2 may have values that is equal to or larger than about 45° and equal to or smaller than about 90°. Accordingly, the pixels defining the first domain DM1 may have relatively better left/right viewing angle characteristics than those of the pixels having the second domain DM2, and the pixel defining the second domain DM2 may have relatively better upper/lower viewing angle characteristics than those of the pixels having the first domain DM1.

In an embodiment, among the pixels illustrated in FIG. 7, the pixel electrodes PE1_1a and PE5_1a of the first and fifth pixels of the first pixel portion BPX_1a and the pixel electrodes PX1_2a and PX5_2a of the first and fifth pixels of the second pixel portion BPX_2a may define the first domain DM1 including the first and second sub-domains SDM1 and SDM2. In such an embodiment, the pixel electrodes PE2_1a, PE3_1a, and PE4_1a of the second to third pixels of the second pixel portion BPX_2a and the pixel electrodes PX2_2a, PX3_2a, and PX4_2a of the second to third pixels of the second pixel portion BPX_2a may define the second domain DM2 including the third and fourth sub-domains SDM3 and SDM4. Accordingly, the deviation of the left/right and upper/lower viewing angles may be minimized in comparison to a case where only the pixels having the first domain DM1 that includes the first and second sub-domains SDM1 and SDM2 are arranged or a case where only the pixels having the second domain DM2 that includes the third and fourth sub-domains SDM3 and SDM4 are arranged.

In such an embodiment, the slits have more diverse included angles with respect to the imaginary straight line that extends in the first direction D1, and thus the deviation of the left/right and upper/lower viewing angles may become smaller in comparison to the embodiment illustrated in FIGS. 1 and 2.

Figure 8:
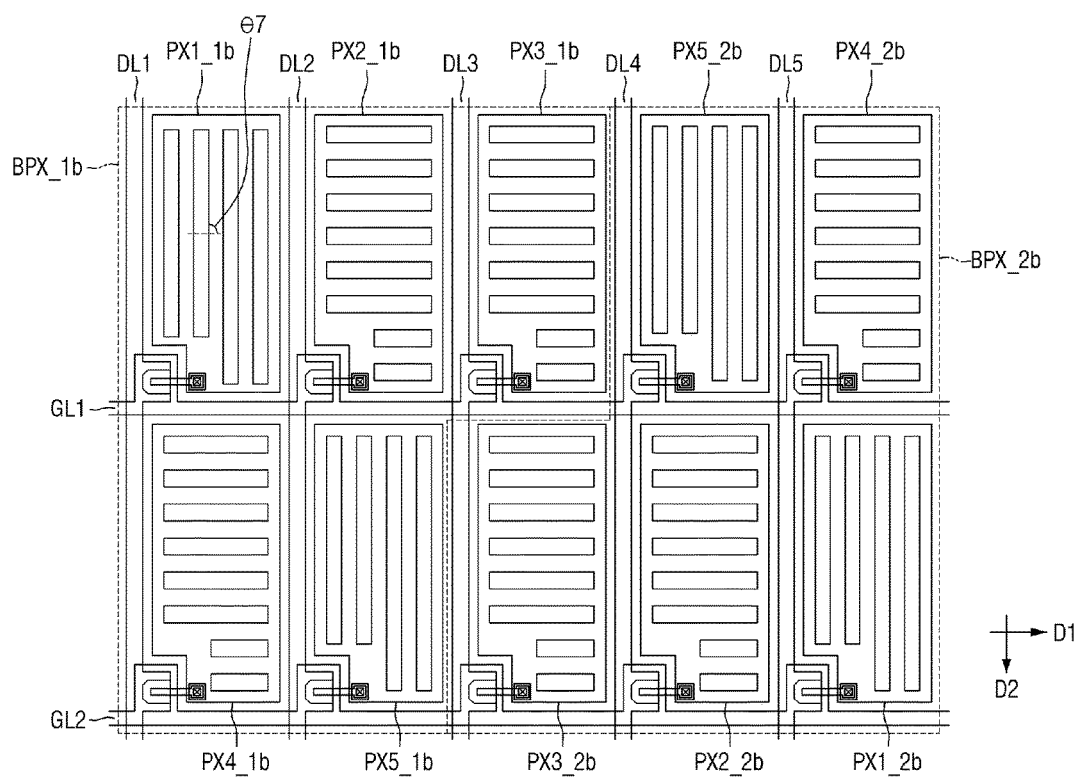
FIG. 8 is a plan view of some pixels according to another alternative embodiment of the invention.

FIG. 8 is a plan view of some pixels according to another alternative embodiment of the invention.

The liquid crystal display shown in FIG. 8 is substantially the same as the liquid crystal display shown in FIGS. 1 to 3 except for the pixel electrodes. The same or like elements shown in FIG. 8 have been labeled with the same reference characters as used above to describe the embodiments of the liquid crystal display shown in FIGS. 1 to 3, and any repetitive detailed description thereof will hereinafter be omitted or simplified.

Referring to FIG. 8, in an embodiment, pixel electrodes PE1_1b and PE5_1b of the first and fifth pixels of the first pixel portion BPX_1b and pixel electrode PE1_2b and PE5_2b of the first and fifth pixels of the second pixel portion BPX_2b define the first domain DM1, and the slits SL of the pixel electrodes of these pixels may have a seventh included angle θ7 of about 90°, which is an included angle with respect to the imaginary straight line that extends along the first direction D1.

In such an embodiment, pixel electrodes PE2_1b, PE3_1b and PE4_1b of the second to fourth pixels of the first pixel unit BPX_1b and pixel electrode PE2_2b, PE3_2b and PE4_2b of the second to fourth pixels of the second pixel portion BPX_2b define the second domain DM2, and the slits SL of the pixel electrodes of these pixels have an eighth included angle θ8 of about zero degree (0°), which is an included angle with respect to the imaginary straight line that extends along the first direction D1. That is, the slits SL of the pixel electrodes of the pixels defining the second domain DM2 are formed in parallel to the imaginary straight line that extends along the first direction D1.

In an embodiment illustrated in FIG. 2, one pixel portion BPX_1 or BPX_2 includes two pixels including slits SL arranged in parallel to the first direction D1 and three pixels including slits SL vertically arranged in the first direction, and thus the upper/lower viewing angle characteristics may become further advantageous. In an alternative embodiment, one pixel portion BPX_1b to BPX_2b includes three pixels including the slits SL arranged in parallel to the first direction D1 and three pixels including the slits SL vertically arranged in the first direction, and thus the left/right viewing angle characteristics may become further advantageous.

Figure 9:
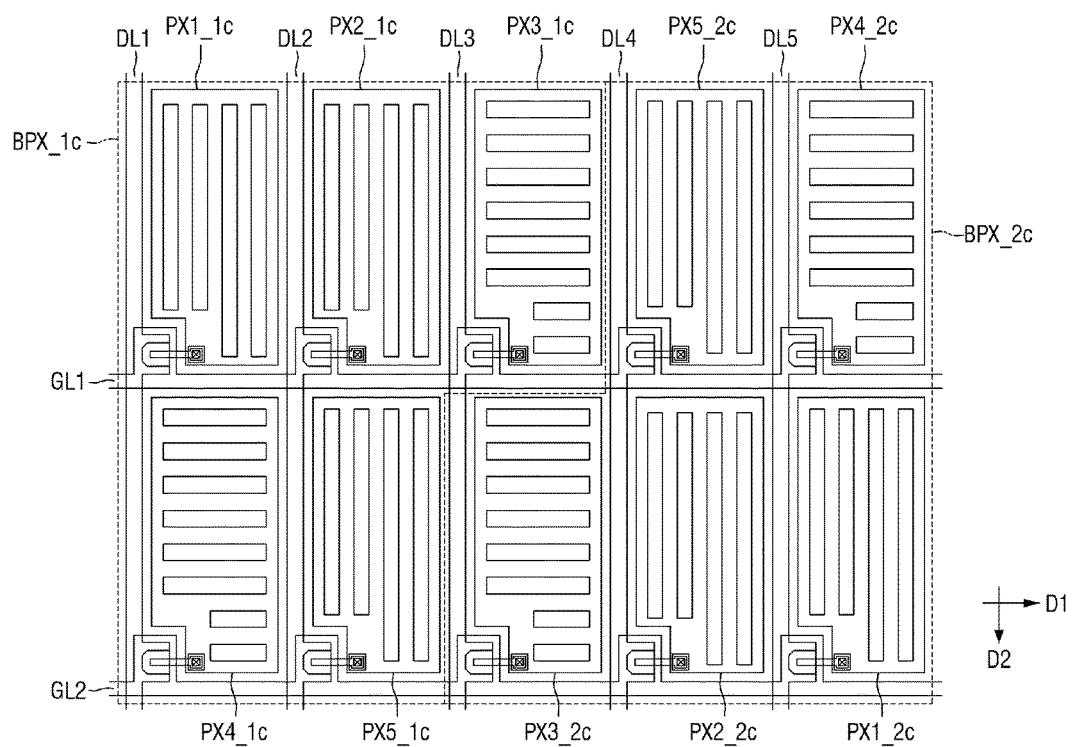
FIG. 9 is a plan view of some pixels according to still another alternative embodiment of the invention.

FIG. 9 is a plan view of some pixels according to still another alternative embodiment of the invention.

The liquid crystal display shown in FIG. 9 is substantially the same as the liquid crystal display shown in FIGS. 1 to 3 except for the pixel electrodes. The same or like elements shown in FIG. 9 have been labeled with the same reference characters as used above to describe the embodiments of the liquid crystal display shown in FIGS. 1 to 3, and any repetitive detailed description thereof will hereinafter be omitted or simplified.

Referring to FIG. 9, in an embodiment, pixel electrodes PE3_1c and PE4_1c of the third and fourth pixels of the first pixel portion BPX_1c and pixel electrode PE3_2c and PE4_2c of the third and fourth pixels of the second pixel portion BPX_2c define the first domain DM1, and the pixel electrodes PX1_1c, PCX2_1c and PX5_1c of the first, second and fifth pixels of the first pixel portion BPX_1c and pixel electrodes PX1_2c, PX2_2c and PX5_2c of the first, second and fifth pixels of the second pixel portion BPX_2c define the second domain DM2.

In an embodiment, the pixels defining the first domain DM1 in the one pixel portion are the pixel electrodes of the first pixel and the fifth pixel, but not being limited thereto. In an alternative embodiment, the pixel electrodes of the third pixel and the fourth pixel may define the first domain DM1. In such an embodiment, certain two pixels among five pixels included in one pixel portion may define the first domain DM1, and the remaining three pixels among five pixels included in the one pixel portion may define the first domain DM1.

Figure 10:
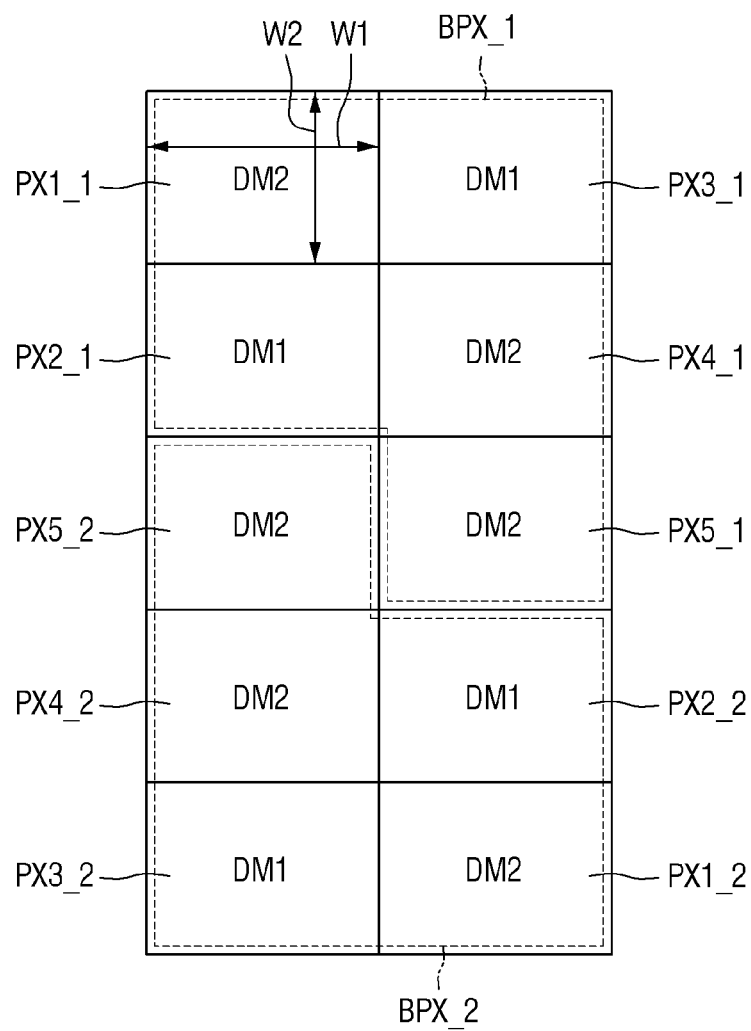
FIG. 10 is a schematic view of some pixels according to still another alternative embodiment of the invention.
Figure 11:
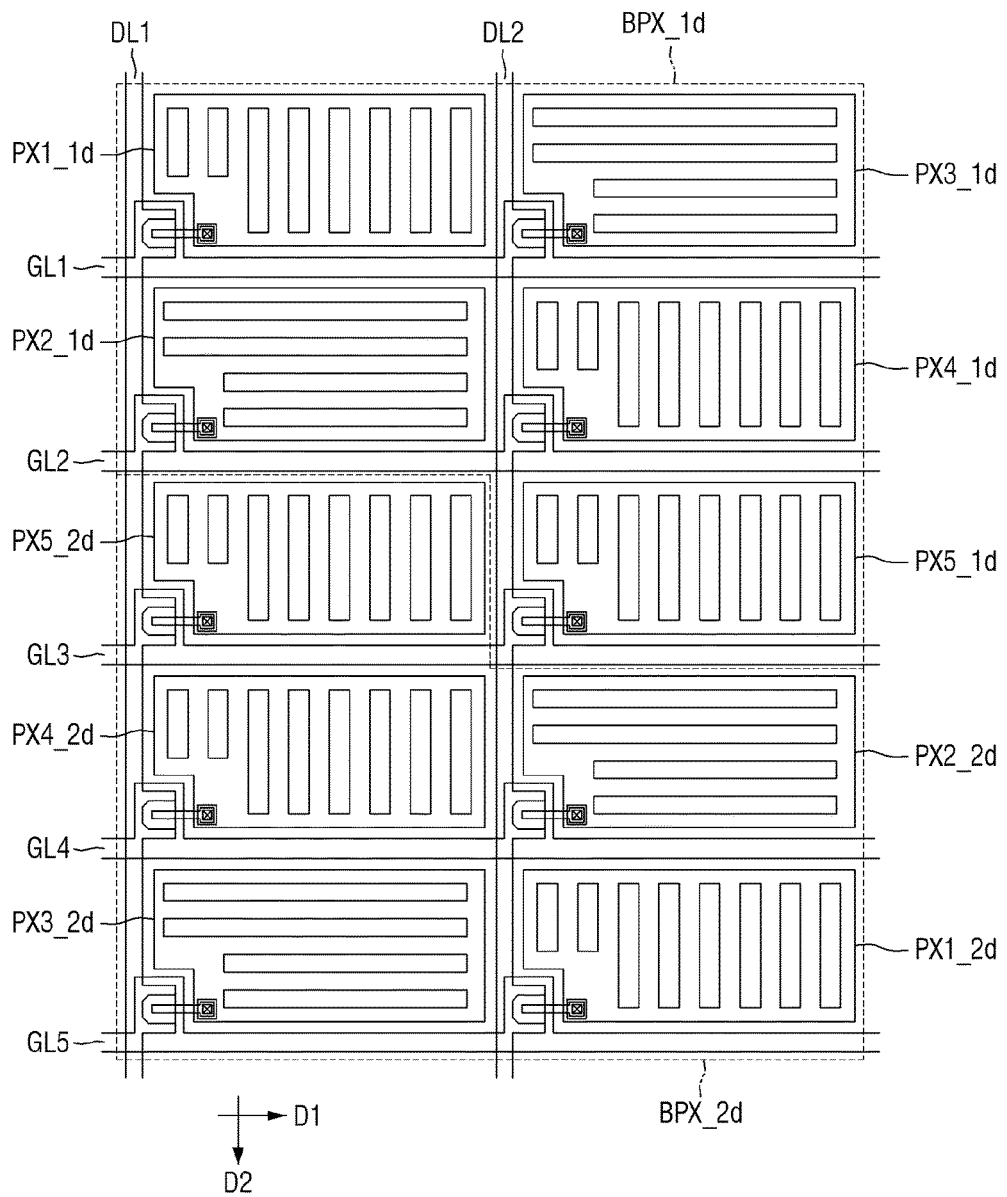
FIG. 11 is a plan view of some pixels according to still another alternative embodiment of the invention.

FIG. 10 is a schematic view of some pixels according to still another alternative embodiment of the invention, and FIG. 11 is a plan view of some pixels according to still another alternative embodiment of the invention.

FIG. 11 corresponds to a plan view illustrating the pixels, which are schematically shown in FIG. 10. The liquid crystal display shown in FIGS. 10 and 11 is substantially the same as the liquid crystal display shown in FIGS. 1 to 3 except for the pixel electrodes. The same or like elements shown in FIGS. 10 and 11 have been labeled with the same reference characters as used above to describe the embodiments of the liquid crystal display shown in FIGS. 1 to 3, and any repetitive detailed description thereof will hereinafter be omitted or simplified.

Referring to FIGS. 10 and 11, unlike the embodiment illustrated in FIGS. 1 and 2, the width W1 in the first direction of one pixel has a larger value than the value of the width W2 in the second direction. In an embodiment, as shown in FIGS. 10 and 11, three pixels that are successively arranged in one pixel portion BPX_1 or PBX_2 are arranged along the second direction D2.

In such an embodiment, the first pixel portion BPX_1 includes first to fifth pixels PX1_1 to PX5_1. The first and second pixels PX1_1 and PX2_1 may be successively arranged along the second direction D2, and the third pixel PX3_1 may be arranged on one side (right side in the drawing) in the first direction D1 of the first pixel PX1_1. In such an embodiment, the fourth and fifth pixels PX4_1 and PX5_1 may be successively arranged on one side (lower side in the drawing) in the second direction D2 of the third pixel PX3_1. As a result, the first pixel portion BPX_1 may have a structure in which two pixels in the first direction D1 and two pixels in the second direction D2 are symmetrically arranged with respect to the first direction D1 and the second direction D2, and one pixel is asymmetrically arranged on one side (lower side in the drawing) in the second direction D2.

In such an embodiment, two pixels of the first to fifth pixels PX1_1 to PX5_1 may define the first domain DM1, and the remaining three pixels may define the second domain DM2. The first domain DM1 and the second domain DM2 may be determined based on the shape of the pixel electrode as described above.

In an embodiment, the second pixel portion BPX_2 may have a shape that is obtained by rotating the first pixel portion BPX_1 by about 180°. However, unlike the embodiment illustrated in FIGS. 1 and 2, the second pixel portion BPX_2 may be adjacent to the one side (lower side in the drawing) in the second direction D2 of the first pixel portion BPX_1. In such an embodiment, by adjacently arranging one first pixel portion BPX_1 and one second pixel portion BPX_2 along the second direction D2, a symmetrical shape may be obtained both in the first and second directions D1 and D2, and the one first pixel portion BPX_1 and one second pixel portion BPX_2, which are adjacently arranged, are repeatedly arraigned in the liquid crystal display.

In an embodiment of the liquid crystal display, as described above, adjacent pixels may define different domains. If the domains defined by the adjacent pixels become different, an initial alignment direction of the liquid crystal molecules LC therein also becomes different, and if the domains become different even in the case where an electric field is applied to the liquid crystal molecules LC, the liquid crystal molecules LC are arranged in different directions. However, since the liquid crystal layer LCL is not divided by pixels PX, but is integrally formed in the pixels PX, the liquid crystal molecules LC in the liquid crystal layers LCL of the two adjacent pixels may interfere with each other to cause undesired light leakage to occur. In such an embodiment, the light blocking member BM arranged between the adjacent pixels may have a thick width. Hereinafter, an embodiment having a structure that allows the light blocking member BM arranged between the adjacent pixels to have a thin width and which may effectively prevent the light leakage, will be described.

Figure 12:
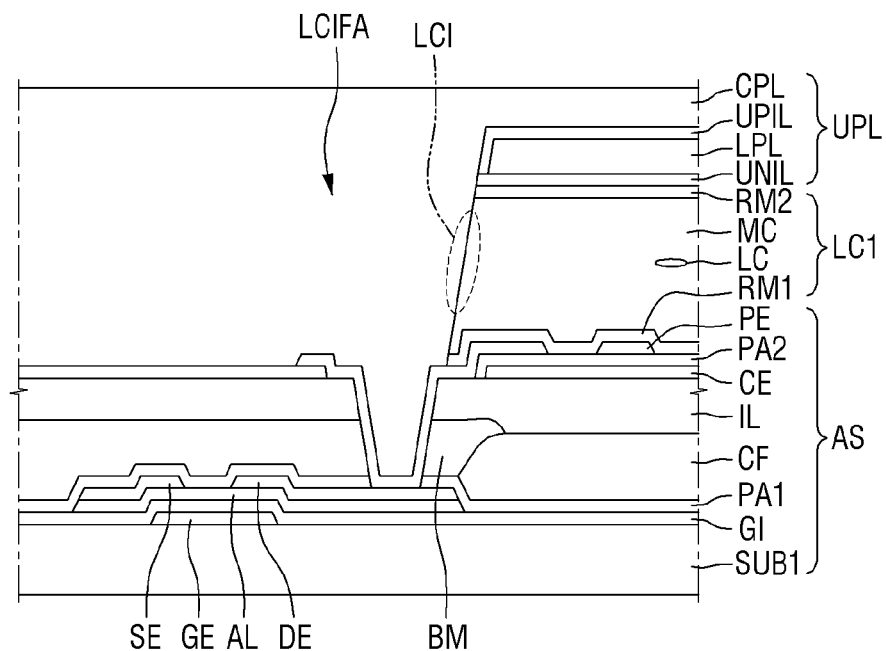
FIG. 12 is a cross-sectional view of a liquid crystal display taken along a line that corresponds to I-I' according to still another alternative embodiment of the invention.
Figure 13:
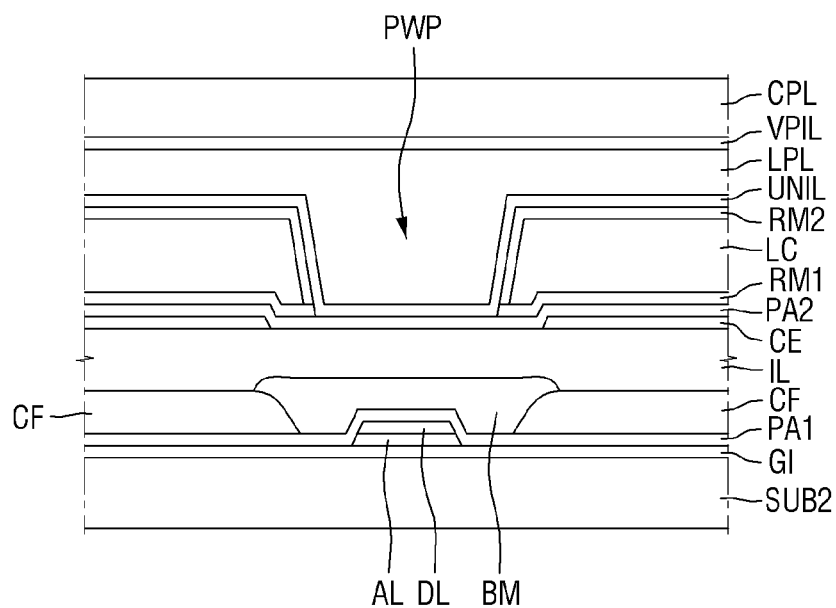
FIG. 13 is a cross-sectional view of a liquid crystal display taken along a line that corresponds to II-II' according to still another alternative embodiment of the invention.

FIG. 12 is a cross-sectional view of a liquid crystal display taken along a line that corresponds to line I-I' of FIG. 2, according to still another alternative embodiment of the invention, and FIG. 13 is a cross-sectional view of a liquid crystal display taken along a line that corresponds to line II-II' of FIG. 2, according to still another alternative embodiment of the invention.

The liquid crystal display shown in FIGS. 12 and 13 is substantially the same as the liquid crystal display shown in FIGS. 1 to 3 except for the pixel electrodes. The same or like elements shown in FIGS. 12 and 13 have been labeled with the same reference characters as used above to describe the embodiments of the liquid crystal display shown in FIGS. 1 to 3, and any repetitive detailed description thereof will hereinafter be omitted or simplified.

Referring to FIGS. 12 and 13, an embodiment of a liquid crystal display includes an array substrate AS, a liquid crystal layer LCL and an upper layer UPL.

First, the array substrate AS will be described in detail.

In the array substrate AS, gate wirings GL and GE, a gate insulating layer GI, a semiconductor layer AL, data wirings DL and SE and a first passivation layer PA1 are disposed on the first base substrate SUB1, as described above with reference to FIG. 3.

A light blocking member BM is disposed on the first passivation layer PA1. The light blocking member BM may have a lattice structure, through which an opening that corresponds to a region, in which an image is displayed, is defined, and the light blocking member BM may include or be formed of a material that is unable to transmit light as described above. In such an embodiment, as illustrated in FIG. 12, the light blocking member BM is disposed or formed in the array substrate AS.

A color filter CF is disposed on the opening of the light blocking member BM. In such an embodiment, as illustrated in FIG. 12, the color filter CF is disposed or formed in the array substrate AS.

A protection layer IL is disposed on the light blocking member BM and the color filter CF to cover the light blocking member BM and the color filter CF. In an embodiment, where a step height occurs due to a difference in thickness between the color filter CF and the light blocking member BM as illustrated in FIGS. 12 and 13, the protection layer IL may include an organic insulating material to minimize or remove the step due to the difference in thickness between the color filter CF and the light blocking member BM.

A common electrode CE is disposed on the protection layer IL, and a second passivation layer PA2 is disposed on the common electrode CE. In such an embodiment, a pixel electrode PE may be disposed on the second passivation layer PA2.

Hereinafter, the liquid crystal layer LCL and an upper layer UPL will be described in detail.

A first reactive mesogen layer RM1 is disposed on the pixel electrode PE, a microcavity MC is defined on the first reactive mesogen layer RM1, and a second reactive mesogen layer RM2 is disposed on the microcavity MC. A liquid crystal material that includes liquid crystal molecules LC is disposed in, e.g., injected into, the microcavity MC, and the microcavity MC includes a liquid crystal injection port LCI.

The microcavity MC is arranged to overlap the pixel electrode PE. In such an embodiment, an alignment material for forming the first and second reactive mesogen layers RM1 and RM2 and the liquid crystal material including the liquid crystal molecules LC may be injected into the microcavity MC using a capillary force.

The microcavity MC is divided in a direction that is perpendicular to the first base substrate SUB1 by a plurality of liquid crystal injector forming areas LCIFA positioned in a portion that overlaps the gate wirings GL and GE, and a plurality of microcavities may be provided along a direction in which the gate wirings GL and GE are spread.

A lower insulating layer UNIL is disposed on the second reactive mesogen layer RM2. The lower insulating layer UNIL may include or be formed of silicon nitride (SiNx) or silicon oxide (SiO2).

A loop layer LPL is disposed on the lower insulating layer UNIL. The loop layer LPL may serve to support the microcavity MC so that the microcavity MC may be formed. The loop layer LPL may include photoresist or other organic material.

An upper insulating layer UPIL is disposed on the loop layer LPL. The upper insulating layer UPIL comes in contact with an upper surface of the loop layer LPL. The upper insulating layer may be formed of silicon nitride (SiNx) or silicon oxide (SiO2).

A capping layer CPL is disposed on the upper insulating layer UPIL. The capping layer CPL fills the liquid crystal injector forming area LCIFA and covers the liquid crystal injector of the microcavity MC that is exposed by the liquid crystal injector forming area LCIFA.

In such an embodiment, as illustrated in FIG. 13, a partition wall portion PWP is disposed between neighboring microcavities MC. The partition wall portion PWP may be provided along a direction in which the data line DL is spread, and is covered by the loop layer LPL. The lower insulating layer UNIL, the upper insulating layer UPIL and the loop layer LPL are disposed in, e.g., fill, the partition wall portion PWP, and such a structure forms a partition wall to partition or define the microcavity MC.

In such an embodiment, the partition wall structure, such as the partition wall portion PWP, is provided between the microcavities MC, such that the liquid crystal molecules LC of the adjacent pixels may be independently controlled without being affected by each other. Accordingly, even when different domains are defined by two adjacent pixels, light leakage or misalignment of the liquid crystal molecules may be prevented from occurring.

Although preferred embodiments of the invention have been described for illustrative purposes, those skilled in the art will appreciate that various modifications, additions and substitutions are possible, without departing from the scope and spirit of the invention as disclosed in the accompanying claims.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A liquid crystal display comprising:
    a plurality of pixels arranged in a matrix form with m rows and n columns, wherein m and n are natural numbers,
    wherein the plurality of pixels defines a plurality of first and second pixel portions,
    a first pixel portion includes a pixel in the i-th row and j-th column, a pixel in the i-th row and (j+1)-th column, a pixel in the i-th row and (j+2)-th column, a pixel in the (i+1)-th row and j-th column, and a pixel in the (i+1)-th row and (j+1)-th column, wherein i and j are natural numbers,
    a second pixel portion includes a pixel in the i-th row and (j+3)-th column, a pixel in the i-th row and (j+4)-th column, a pixel in the (i+1)-th row and (j+2)-th column, a pixel in the (i+1)-th row and (j+3)-th column, and a pixel in the (i+1)-th row and (j+4) column,
    pixel electrodes of two of the pixels of the first pixel portion define a first domain, and pixel electrodes of the remaining three of the pixels of the first pixel portion define a second domain, which is different from the first domain,
    pixel electrodes of two of the pixels of the second pixel portion define the first domain, and pixel electrodes of the remaining three of the pixels of the second pixel portion define the second domain, and
    the first and second domains in the first pixel portion and the first and second domains in the second pixel portion are in a symmetric relationship about a diagonal line that is about 45 degrees with respect to an extending direction of the first domain,
    wherein
    the pixel in the i-th row and j-th column and the pixel in the (i+1)-th row and (j+1)-th column define the first domain, and
    the pixel in the i-th row and (j+1)-th column, the pixel in the i-th row and (j+2)-th column, and the pixel in the (i+1)-th row and j-th column define the second domain.

2. The liquid crystal display of claim 1, further comprising:
    a liquid crystal layer which overlaps regions in which the pixels in the i-th row and j-th column through the i-th row and (j+4)-th column and the pixels in the (i+1)-th row and j-th column through the (i+1)-th row and (j+4)-th column are arranged; and
    partition walls between the pixels in the i-th row and j-th column through the i-th row and (j+4)-th column and the pixels in the (i+1)-th row and j-th column through the (i+1)-th row and (j+4)-th column, which are adjacent to each other, and
    wherein the partition walls partition the liquid crystal layer in a way such that the liquid crystal layer is independently arranged in each pixel.

3. The liquid crystal display of claim 1, wherein a ratio of the number of the pixels defining the first domain to the number of the pixels defining the second domain among the plurality of pixels arranged with the m rows and the n columns is 2:3.

* * * * *